United States Patent [19]

Kaplan

[11] Patent Number: 4,978,940
[45] Date of Patent: * Dec. 18, 1990

[54] AUTOMOBILE SECURITY SYSTEM

[75] Inventor: Neil B. Kaplan, Cohasset, Mass.

[73] Assignee: Boston Auto Security, Inc., Hingham, Mass.

[*] Notice: The portion of the term of this patent subsequent to Dec. 20, 2005 has been disclaimed.

[21] Appl. No.: 286,309

[22] Filed: Dec. 19, 1988

Related U.S. Application Data

[63] Continuation of Ser. No. 944,665, Dec. 19, 1986, Pat. No. 4,792,784.

[51] Int. Cl.$^5$ ............................................. B60R 25/00
[52] U.S. Cl. ................................... 340/426; 307/10.3; 70/371
[58] Field of Search ............... 340/426, 428, 429, 514; 307/10.2, 10.3; 70/369–371, 240, 241

[56] References Cited

U.S. PATENT DOCUMENTS

| | | | |
|---|---|---|---|
| 3,286,773 | 11/1966 | Russell et al. | 70/371 |
| 3,402,582 | 9/1968 | Jacobi | 70/371 |
| 4,009,599 | 3/1977 | Patriquin | 70/371 X |
| 4,262,279 | 4/1981 | Dublirr | 340/430 |
| 4,361,827 | 11/1982 | Geller | 340/429 |
| 4,422,068 | 12/1983 | Helft et al. | 340/514 |
| 4,633,234 | 12/1986 | Gagnon | 340/429 X |
| 4,665,379 | 5/1987 | Howell et al. | 340/426 |
| 4,792,784 | 12/1988 | Kaplan | 70/371 X |

Primary Examiner—Joseph A. Orsino
Assistant Examiner—Brian R. Tumm
Attorney, Agent, or Firm—Nutter, McClennen & Fish

[57] ABSTRACT

Vehicle security apparatus includes a tubular housing, a lock barrel having a rotary lock cylinder that controls a retractable latch, the barrel being slidably received in the housing bore and movable between an unlocked extended position and a locked retracted position within the bore. There is also a spring positioned in the housing bore which biases the barrel toward its extended position and detents for establishing the extended and retracted positions of the barrel by engagement with the barrel latch. The barrell is rotatable within the housing to a release position when the barrel is not in its locked position so that the latch no longer engages the detents, enabling the barrel to be pulled entirely out of the housing.

3 Claims, 3 Drawing Sheets

AUTOMOBILE SECURITY SYSTEM

This application is a continuation of Ser. No. 944,665, filed Dec. 19, 1986, and now U.S. Pat. No. 4,792,784.

BACKGROUND OF THE INVENTION

This invention relates to vehicle security apparatus. It relates more particularly to an anti-theft locking system for automobiles and the like which can be actuated by the vehicle operator to disable the vehicle's ignition system, secure the automobile hood and activate a passive alarm system when the vehicle is unattended.

Security systems for safeguarding automobiles have been in use for many years. One commonly used anti-theft lock of this type is depicted in FIG. 1 of the drawings herein. It comprises a tubular housing 10 having a pair of intergral ears 10a extending laterally from the housing at the forward end thereof. At the roots of these ears there is an opening 12 into the housing which is normally closed by a strap 14 which is secured to the two ears by a pair of sleeve rivets 16. Slidably positioned in the forward end segment of housing 10 is a cylindrical barrel 18. Attached to the end of that barrel is a stiff, but flexible, wire 22 which extends from the opposite end of housing 10. Wire 22 is one component of flexible hood lock cable 24, the other component of which is a sheath 26, the forward end of which is connected to an annular plug 28 seated at the rear end of housing 10.

The lock barrel 18 incorporates a spring loaded retractable latch 32 which is mounted in the side of the barrel and normally projects upward therefrom into housing opening 12 where it engages detent 34 formed at the underside of strap 14. That detent has two steps 34a and 34b and when the strap is riveted to the housing ears, those forward and rear steps project down greater and lesser distances into the housing opening 12. Barrel 18 is slidable in housing 10 between an extended unlocked position wherein latch 32, partially extended, engages detent step 34a thereby preventing further outward movement of the barrel and a retracted locked position. In the latter position, the barrel latch 32, fully extended, engages behind detent step 34b so that the barrel is retained in that locked position. A coil spring 36 compressed between plug 28 and the inner end of the barrel urges the barrel toward its extended position.

Barrel 18 also includes a lock cylinder 42 which cooperates with latch 32 so that when the vehicle operator inserts a key K into the cylinder and turns the key, the cylinder turns, thereby retracting latch 32 partway into the barrel so that it is retracted from detent step 34b allowing the barrel to spring to its extended unlocked position where the latch engages step 34a.

In use, the lock is attached to the underside of the vehicle dashboard by bolts extending through the sleeve rivets 16 in the ears 10a. The flexible cable 24 extending from the lock is conducted to the forward end of the vehicle where the free end of the cable sheath 26 is anchored to the vehicle frame, while the free end of the wire 22 is connected to a hood lock. When the barrel 18 is moved to its extended position, the motion of the wire 22 unlocks the hood lock so that the operator can gain access to the engine compartment. On the other hand, when the barrel is pushed to its locked position, the accompanying motion of the wire 22 locks the hood lock thereby securing the engine compartment.

A locking system such as this also invariably incorporates an electrical hood lock switch which is closed when the barrel 18 is in its locked position in order to disable the vehicle's ignition system and/or to activate a passive alarm system installed in the vehicle. In the conventional anti-theft apparatus depicted in FIG. 1, that electrical switch comprises an annular metal contact 46, similar to a washer, mounted to the forward end of plug 28 inside housing 10. An electrical lead 48 connected to that washer extends out of the housing and is led into the engine compartment of the vehicle. The other switch contact is a brass collet contact 52 which encircles the cable wire 22 adjacent to the inner end of barrel 18. A spring 51 compressed between the contact 52 and the barrel urges the contact toward a stop 53 on wire 22. Contact 52 is grounded by way of cable 24 to the vehicle frame so that when barrel 18 is moved to its retracted locked position, contact 52 engages contact 46 thereby connecting lead 48 to electrical ground.

Although the lock depicted in FIG. 1 has been installed on numerous vehicles, it has several disadvantages which make it somewhat vulnerable and limit its ability to adequately protect the vehicle in which it is installed. More particularly, the lock housing 10 and strap 14 are made of so-called white metal which is not a very strong material and may be cracked by a sharp blow from a hammer. Also, as described above, the housing with its strap 14 is a two piece structure. Therefore, it can be penetrated relatively easily by removing or cutting the bolts connecting the housing ears 10a to the vehicle dashboard and inserting a pry bar under one end of the strap 14 and prying it away from its housing ear sufficiently to break rivet 16 and then bending back the strap as shown in FIG. 1. Since the detent 34 is integral to the strap, it is pulled away from barrel latch 32 so that the barrel 18 is free to be sprung to its extended position even though its cylinder is still in the locked position. This barrel extension disables any alarm system controlled by the lock and releases the hood lock giving the thief access to and control over the vehicle as though the anti-theft apparatus was not present at all.

Another weakness in prior locks of this type stems from the fact that the switch contacts 46 and 52 do not always effect a good electrical connection when the barrel 18 is pushed to its locked position. This seems to be due to dirt and oxide build-up on the relatively large-area engaging surfaces of the switch contacts and the problem usually becomes progressively worse with the passage of time. The upshot is that when the barrel is pushed to its locked position, the switch does not always close to deactivate the car's ignition system.

The most important disadvantage of prior locks of this general type is the inability to repair them. In other words, once the lock is assembled and installed, there is no possibility of gaining access to the interior components of the lock without destroying the lock. This is because, as seen in FIG. 1, once the strap 14 is riveted to housing 10, there is no way to retract latch 32 from detent step 34a to permit barrel 18 to be removed from the housing without either breaking the lock housing or the rivets 16. Therefore, if spring 36 should break, or if the switch contacts should become dirty so that the switch no longer functions properly, there is no possibility of making repairs to the lock. As a result, the entire lock becomes useless and must be replaced. Thus, the malfunction of a relatively inexpensive internal component of the lock can result in a high cost outlay.

SUMMARY OF THE INVENTION

Accordingly, it is the object of the present invention to provide improved vehicle security apparatus.

Another object is to provide a vehicle anti-theft lock which is not easy to disable or to inactivate without the proper key.

Another object of the invention is to provide vehicle security apparatus of this type whose internal parts can be repaired or replaced, if need be, after installation of the apparatus.

Another object of the invention is to provide vehicle security apparatus which, when engaged, will reliably deactivate the ignition of the vehicle in which the apparatus is installed, activate any associated passive alarm system and secure the vehicle's hood in order to minimize the likelihood of a thief stealing the vehicle or its contents.

Other objects will, in part, be obvious and will, in part, appear hereinafter.

Vehicle security apparatus made in accordance with this invention includes a tubular housing with integral ears for securing the housing to the vehicle dashboard or frame. The housing is made of stainless steel which is extremely resistent to being penetrated by drilling, cutting etc. Seated in a small slot formed in the housing wall is an insert that forms a latch detent in the housing interior wall. That insert, which is made of an even harder material than the housing, e.g. sintered steel, is flush with the exterior wall of the housing and may be welded in place, thereby making the housing an essentially unitary structure devoid of gaps or cracks into which tools could be inserted to gain access to the interior of the housing.

As will be described, the detent is designed to permit all of the internal components of the apparatus to be installed in the housing after the housing is completely formed, i.e., with the detent welded in place, and to be removed from the housing at a later time, if necessary. These components include a cylindrical lock barrel which is slidably positioned in the proximal end of the housing adjacent to the detent. An electrically insulating annular grommet is seated on an interior ledge at the distal end of the housing and the usual flexible cable extends into that end of the housing with its outer sheath being secured to the grommet and with its inner wire extending along the housing and being anchored to the inner end of the barrel. The cable leads to the hood lock in the vehicle's engine compartment.

The barrel is slidable axially within the housing between axially spaced-apart positions defined by the detent, namely an unlocked position wherein the barrel extends appreciably from the housing and a locked position wherein the barrel is retracted into the housing. A spring is provided between the inner end of the barrel and the grommet to bias the barrel to its extended position. As is customary in locks of this general type, the detent establishes the two positions of the barrel by engagement with a spring-loaded latch projecting from the side of the barrel. This latch is biased into engagement with the detent and may be retracted by rotating a key-operated cylinder incorporated into the barrel.

When the barrel is in its extended position, the engagement of the latch by a radially inner step of the detent prevents further extension of the barrel. When the barrel is pushed to its retracted locked position, the outwardly biased barrel latch engages behind a radially outer step at the proximal end of the detent to retain the barrel in that locked position. The barrel is released from its locked position by turning the barrel's lock cylinder using an appropriate key. The rotation of the cylinder retracts the latch sufficiently to release it from the radially outer detent step, whereupon the barrel springs to its extended position where it is stopped by the engagement of its latch by the radially inner detent step. That movement of the barrel and the cable wire attached thereto is sufficient to unlock the associated hood lock to which the opposite end of the cable wire is connected.

Unlike conventional anti-theft locks and security apparatus of this general type, however, the detent incorporated into applicant's lock housing permits the lock barrel to be moved to a third position which releases its latch from the detent and allows the barrel, as well as the other lock components inside the housing, to be slid completely out of the housing in the event that it becomes necessary to repair or replace any of those components. This third position is defined by a laterally extending, ramp-defining detent leg located adjacent to the radially inner detent step that defines the extended position of the barrel.

So long as the barrel is not in its locked position, the barrel can be positioned axially in the housing so that its latch is aligned with this detent leg and be rotated in the direction of that leg so that the latch engages and follows that leg which, as noted above, defines a ramp. The length and ramp angle of that detent leg are such that when the barrel is rotated on its axis through a relatively small angle, the latch is pushed into the barrel to a substantially fully retracted position which allows the barrel to bypass the detent and be withdrawn completely from the housing, assuming that the opposite end of the cable is free. When the barrel is withdrawn, the cable spring and grommet inside the barrel are pulled out of the housing along with the barrel.

The electrical hood lock switch incorporated into the present apparatus is also quite different from the switches in prior comparable locks typified by the one illustrated in FIG. 1. More particularly, the moving switch contact, instead of being mounted to the cable wire, is supported midway along the spring that biases the barrel toward its extended position. As will be seen in more detail later, the moving switch contact, in the form of a metal washer, is actually captured between a pair of springs connected electrically to the vehicle frame (electrical ground) by way of the lock barrel and cable.

The stationary contact of the switch is mounted to the insulating grommet at the distal end of the lock housing and takes the form of a single conductive button. An electrical lead, connected at one end to that button, extends out of the lock housing to an ignition disconnect switch and/or to a passive alarm system located in the vehicle. When the lock barrel is pushed toward its retracted locked position, the spring is compressed sufficiently to move the washer into engagement with the stationary button contact just before the barrel reaches its locked position.

When that annular moving contact engages the button-like stationary contact, the moving contact tilts or cocks slightly giving rise to a wiping action at the point of engagement. This wiping action tends to remove dirt, oxides and the like from the engaging surfaces, thereby insuring intimate electrical contact of those switch elements and therefore reliable switching action. The fact that the washer-like moving contact is mounted on the biasing springs rather than on the cable wire also allows that contact to rotate on its axis to some extent as the barrel is moved repeatedly between its locked and unlocked positions. Thus, the engagement of the moving contact with the fixed contact is not limited to a particular spot on the moving contact and this also tends to prevent the build-up of dirt and film on the moving contact.

But in any event, as noted above, if those contacts should be covered with dirt or film or if the electrical connection to the stationary contact should be broken, repair and/or replacement of those parts can be accomplished quite easily by rotating the unlocked barrel to its release position so that the barrel, along with the spring and switch contacts, can be pulled out of the housing as described above. Once those repairs are completed, those components can be reinserted into the housing and the barrel slid into the proximal end of the housing with its latch, retracted by hand, in alignment with the detent. As soon as the end of the latch passes over the radially inner detent step, it will snap out to its partially retracted position thereby re-engaging the barrel in its unlocked position in the housing.

Thus, the present lock is very resistent to penetration, particularly at the location of its detent and latch which are the most critical parts of the lock. Yet, the inner workings of the lock are readily accessible in the event that it does become necessary to repair or replace those parts, but such access is still not possible when the lock barrel is in its locked position and is thus not available to a would-be thief. Finally, although the present lock yields the distinct advantages described above, it is still quite easy to assemble and, except for its higher material costs, is no more expensive then prior comparable apparatus of this type.

BRIEF DESCRIPTION OF THE DRAWINGS

For fuller understanding of the nature and objects of the invention, reference should be had to the following detailed description, taken in connection with the accompanying drawings, in which.

DETAILED DESCRIPTION OF THE PREFERRED EMBODIMENT

Figure 1:
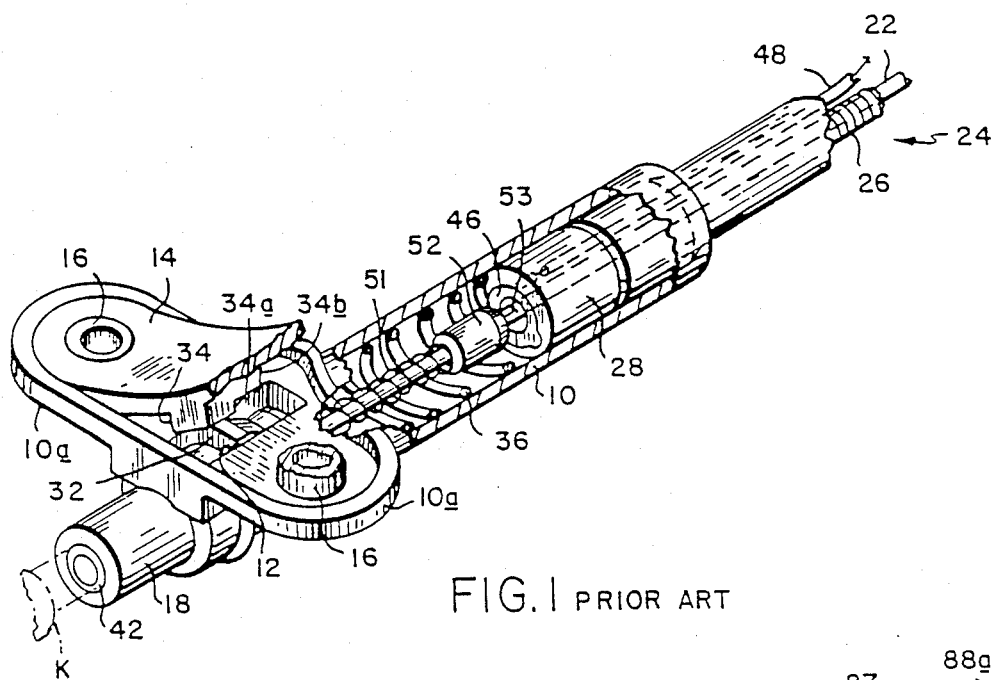
FIG. 1 is an isometric view with parts broken away showing already described vehicle security apparatus according to the prior art.
Figure 2:
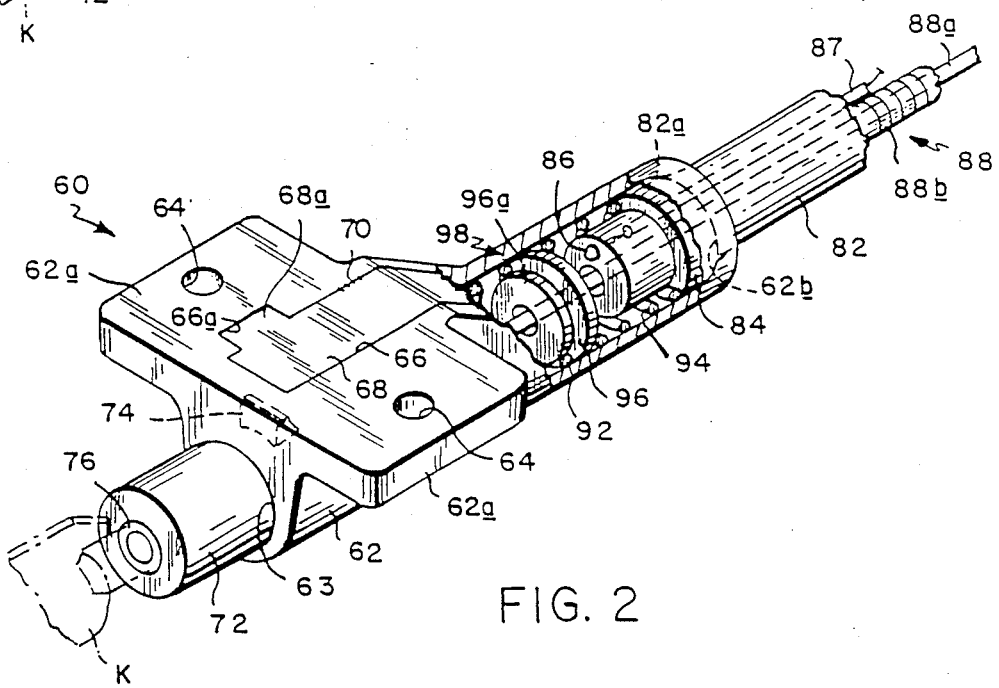
FIG. 2 is a similar view showing security apparatus made in accordance with this invention.

Referring now to FIG. 2 of the drawings, security apparatus incorporating my invention is indicated generally at 60. It comprises a tubular housing 62 made of stainless steel or other comparable strong, penetration-resistant metal and having a cylindrical bore 63. Housing 62 is formed with a pair of integral ears 62a which project out laterally adjacent to the proximal end of the housing. Appropriate bolt holes 64 are present in those ears. A generally rectangular length-wise slot 66 is formed in the upper wall of the housing between the two ears 62a. The slot extends along the housing from a location adjacent to the proximal end of the housing to a location somewhat beyond the ears and it is deep enough to extend into or intercept the housing bore 63. As shown in FIG. 2, slot 66 includes a short generally rectangular notch 66a which projects laterally of slot 66 and extends vertically down through the wall of the housing until it intercepts the housing bore 63. Notch 66a is desirably located axially inward from the proximal end of slot 66. While it is shown in FIG. 2 as projecting out to the left from notch 66, it could just as well project out from the slot toward the right in that figure.

Seated in slot 66 and notch 66a flush with the outer wall of the housing is an insert 68 made of a very strong penetration-resistant material metal such as sintered steel. Insert 68 completely covers and partially fills slot 66, including notch 66a. Insert 68 is very tightly press fit into the housing and a flush weld bead 70 may be provided at the joint around the insert so that there is no possibility of the insert being lifted out of the housing wall by a prying tool. As noted above, the insert is made of a very strong hardened steel so that there is very little liklihood of the insert itself being penetrated. As will be seen presently, the inner surface of the insert 68 constitutes a detent 100 (FIG. 3) to be described later on which the operation of the lock depends.

Figure 3:
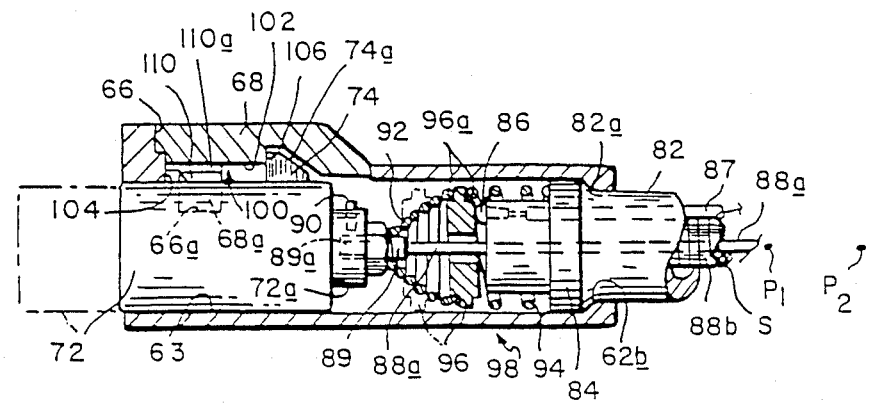
FIG. 3 is a sectional view with parts in elevation showing the inside of the apparatus for greater detail.

Referring now to FIGS. 2 and 3, a cylindrical lock barrel 72 of more or less conventional construction is slidably positioned in housing bore 63. It includes a spring-loaded latch 74 which projects out from the side of the barrel and a cooperating rotary lock cylinder or arbor 76 mounted axially in the barrel. Unlike conventional locks, arbor 76 is made of hardened steel to resist drilling and punching. When the cylinder is oriented at a selected angular position relative to the barrel, the latch 74 is fully extended under its spring bias. However, when cylinder 76 is rotated in one direction from that position, e.g. clockwise, by an appropriate key K, the latch 74 is retracted partially, but not completely, into barrel 72. A suitable barrel with integral locking cylinder for use in apparatus 60 is incorporated into anti-theft apparatus currently marketed by applicant under the trademark Z-LOK.

Still referring to FIGS. 2 and 3, extending into the distal end of the housing 62 is a heavy steel sleeve 82 with an end flare 82a which engages around an interior, ledge 62b formed at the distal end of housing bore 63. Sleeve 82 is long enough to extend from the lock through the vehicle firewall when the lock is mounted to the underside of the vehicle dashboard by way of bolts (not shown) extending through the holes 64 in housing ears 62a. Preferably, the tube has a factory-installed water impermeable seal (not shown) inside the tube or at least on the distal end thereof to exclude dirt and moisture from the apparatus. Seated inside housing bore 63 against the sleeve flange 82a is an annular grommet 84 made of a suitable electrical insulating material such as nylon or Delrin brand plastic material. The diameter of grommet 84 is only slightly smaller than that of the bore so that the grommet fits snuggly within the housing. A stationary switch contact 86 in the form of a headed brass pin or button is staked in grommet 84 and an electrical lead 87 soldered to contact 86 extends out of housing 62 through sleeve 82. Lead 87 is long enough to extend into the vehicle's engine compartment for connection to the vehicle's ignition system and/or to an alarm system installed in the vehicle.

Also extending into the distal end of the lock housing 62 is a flexible cable 88 consisting of a stiff inner cable wire 88a made of polished stainless steel or the like. The end of wire 88a inside the housing is anchored to a connector 89 having a threaded shaft 89a screwed into a fixture 72a formed at the inner end of barrel 72. The connection is locked to that fixture by a set screw 90 threaded into the side of the fixture and which engages shaft 89a. The remaining component of the cable, namely a flexible tubular sheath 88b, which is essentially a tightly coiled spring, extends through tube 82 and is anchored by suitable means (not shown) to grommet 84 or to housing 62. The distal end of the cable 88 leads into the vehicle's engine compartment where the central wire 88a is connected to a hood lock and the sheath 88b is anchored to the vehicle frame. When the barrel 72 is moved axially within housing 62, the cable wire 88a is shifted lengthwise relative to its sheath 88b sufficiently to actuate the hood lock.

Also as best seen in FIGS. 2 and 3, a pair of coil springs 92 and 94 encircling cable wire 88a are compressed between the inner end of barrel 72 and grommet 84. Captured between adjacent ends of those springs is a movable switch contact 96 in a form of a relatively thick conductive metal washer. Contact 96 has peripheral notches 96a in its opposite faces which are dimensioned to receive the adjacent end convolutions of the two springs 92 and 94. Contact 96, along with the previously described stationary contact 86 on the grommet, comprise a hood lock switch shown generally at 98.

Referring now to FIG. 3 of the drawings, the inner surface of insert 68 constituting the detent 100 defines the locked and unlocked positions of barrel 72 in housing bore 63. More particularly, a relatively long proximal end segment of the detent has a height or thickness which is somewhat less than that of the depth of the slot 66 in the housing 62 wall so that the inner surface 102 of that segment is spaced radially outward from the wall of housing bore 63. This dimensional difference creates a step 104 adjacent to the proximal end of the housing which is engaged by the outwardly biased barrel latch 74 to fix the extended position of the barrel shown in phantom in FIG. 3. When the barrel is in that unlocked extended position, the movable switch contact 96 is spaced away from the fixed contact 86 as shown in phantom in FIG. 3 and the cable wire 88a is located at a selected position P₁ relative to a fixed point S on cable sheath 88b (FIG. 3).

Detent 100 also has a interior notch 106 approximately two-thirds of the way along the insert 68 so that when the barrel 72 is pushed into the housing 62 to its solid line position in FIG. 3 so that its outer end is flush with the proximal end of the housing, the outwardly-biased latch 74 snaps into the notch 106 thereby locking the barrel in that retracted position. Such retraction of the barrel suffices to shift the cable wire 88a relative to point S on sheath 88b to the position P₂ shown in FIG. 3.

Just before the barrel reaches that position, the barrel springs 92 and 94 are compressed sufficiently to advance the movable switch contact 96 into engagement with stationary contact 86. Thus, when the barrel is locked in its solid-line retracted position, the contact 96 is maintained in intimate electrical engagement with contact 86. Furthermore, because annular contact 96 makes essentially point contact with button contact 86, the former is cocked or tilted relative to the axis of the housing 62 so that it assumes the position shown in FIG. 3. This cocking movement of contact 96 causes that contact to wipe the stationary contact 86 slightly thereby tending to remove or rub away any dirt or oxides present at those engaging surfaces. This wiping action insures that the electrical hood lock switch 98 incorporated into the apparatus will assuredly be closed when the barrel 72 is in its locked position shown in solid lines in FIG. 3.

In addition to being tilted upon its engagement with the stationary contact, the movable contact 96 is also free to rotate on and with springs 92 and 94 to some extent as the barrel 72 is shifted repeatedly between its locked and unlocked positions so that a clean electrical contact line is maintained all around contact 96.

Figure 4:
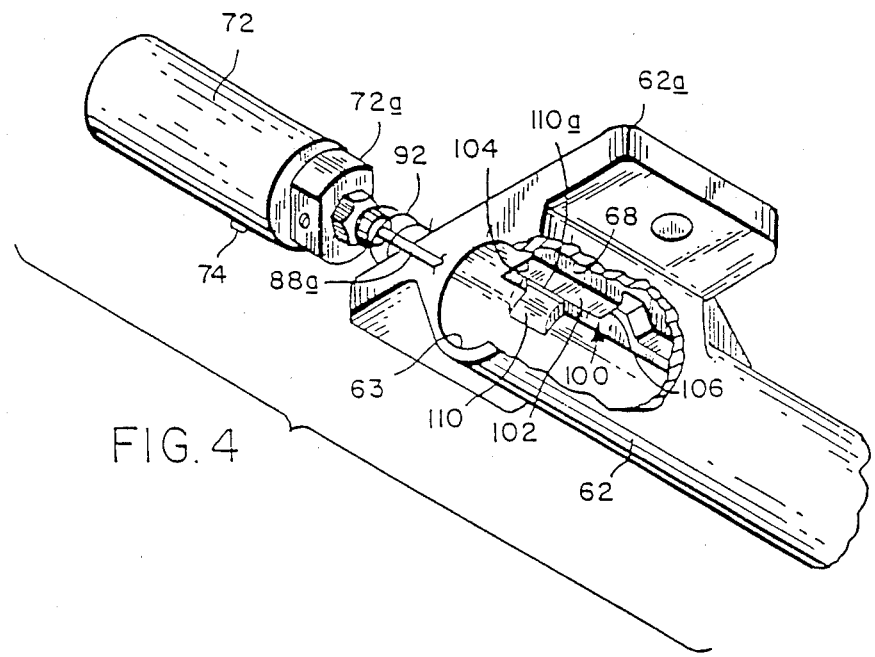
FIG. 4 is an exploded isometric view with parts broken away showing certain components of the FIG. 2 apparatus.

Referring now to FIGS. 3 and 4, the inner surface of the insert leg 68a is sloped so that it forms a ramp 110 extending generally circumfrentially between detent surface 102 and the wall of housing bore 63. Preferably, there is a short downward step 110a at the top of the ramp adjacent to surface 102. When barrel 72 is positioned in bore 63 so that latch 74 is located directly opposite insert leg 68a, the barrel can be rotated on its axis in the direction that moves latch 74 along the ramp 110, i.e. counterclockwise in FIG. 4. The ramp step 110a is provided so that a conscious effort is required to position the latch on ramp 110. The ramp surface functions as a wedge or cam which pushes latch 74 progressively into barrel 72. By the time the latch reaches the bottom of the ramp, which is essentially flush with the wall of bore 63, the latch is retracted substantially completely into the barrel so that it no longer prevents the barrel from being pulled out of the housing. In a typical lock made according to the invention, a barrel rotation in the order of 90° suffices to bring the barrel to its release position so that the barrel can be pulled from the housing, assuming that the distal end of the cable 88 is free.

When the barrel is pulled out of the housing, the cable wire 88a, springs 92 and 94, switch contact 96 and grommet 84 can all be slid out of the housing 62. This permits barrel 72 and all of those other internal parts to be maintained, repaired or replaced as necesary, even after the apparatus 60 is installed in the vehicle.

Preferably, the insert leg 68a extends laterally from the insert 68 in the direction opposite to the direction that the key K is rotated in order to unlock barrel 72. This prevents the operator from inadvertently rotating the barrel to its release position when he is unlocking the lock. In other words, in the apparatus illustrated herein, the lock cylinder 76 must be rotated, using key K, in a clockwise direction in order to turn cylinder 76 and thus retract latch 74 sufficiently to enable the barrel to spring to its unlocked position shown in phantom in FIG. 3. Now in order to move the barrel to its release position, the barrel must first be pushed in slightly to align latch 74 axially with insert leg 68a and then the barrel must be rotated counterclockwise sufficiently (e.g. 90°) to slide latch 74 along ramp 110 until the latch outer end engages the wall of housing bore 63. At this point, if barrel 72 is pulled outward, latch 74 will bypass the detent step 104 that normally fixes the extended position of the barrel thereby allowing the barrel to be pulled completely from the housing. The proximal end of cable wire 88a can then be released from barrel 72 by loosening set screw 90 and separating connector 89 from the barrel. This permits removal and replacement of the springs 92 and 94, as well as switch contacts 86 and 96.

After performing the required maintenance or repair, the various components of apparatus 60 can be reinserted into the housing and the proximal end of cable wire 88a can be reattached to the inner end of barrel 72. Then the barrel can be reinserted into the housing bore 63 simply by pushing latch 74 into the barrel using one's thumb and reinserting the barrel into housing bore 63. To facilitate this insertion process, the edge of latch 74 facing the housing is bevelled at 74a (FIG. 3) so that once the initial insertion on reinsertion process is started, the pressure of the housing end against the bevelled edge of the latch will wedge the latch toward its retracted position allowing the barrel to be telescoped into the housing. The barrel may now be rotated on its axis to locate latch 74 opposite insert 68, whereupon the latch will spring out behind step 104 thereby fixing the barrel in its extended position described above. After the distal end of the cable 88 is re-attached, the barrel 72 may be pushed into the housing to its retracted locked position shown in solid lines in FIG. 3 to lock the vehicle's hood and to activate any associated passive alarm control system as described above.

Figure 5:
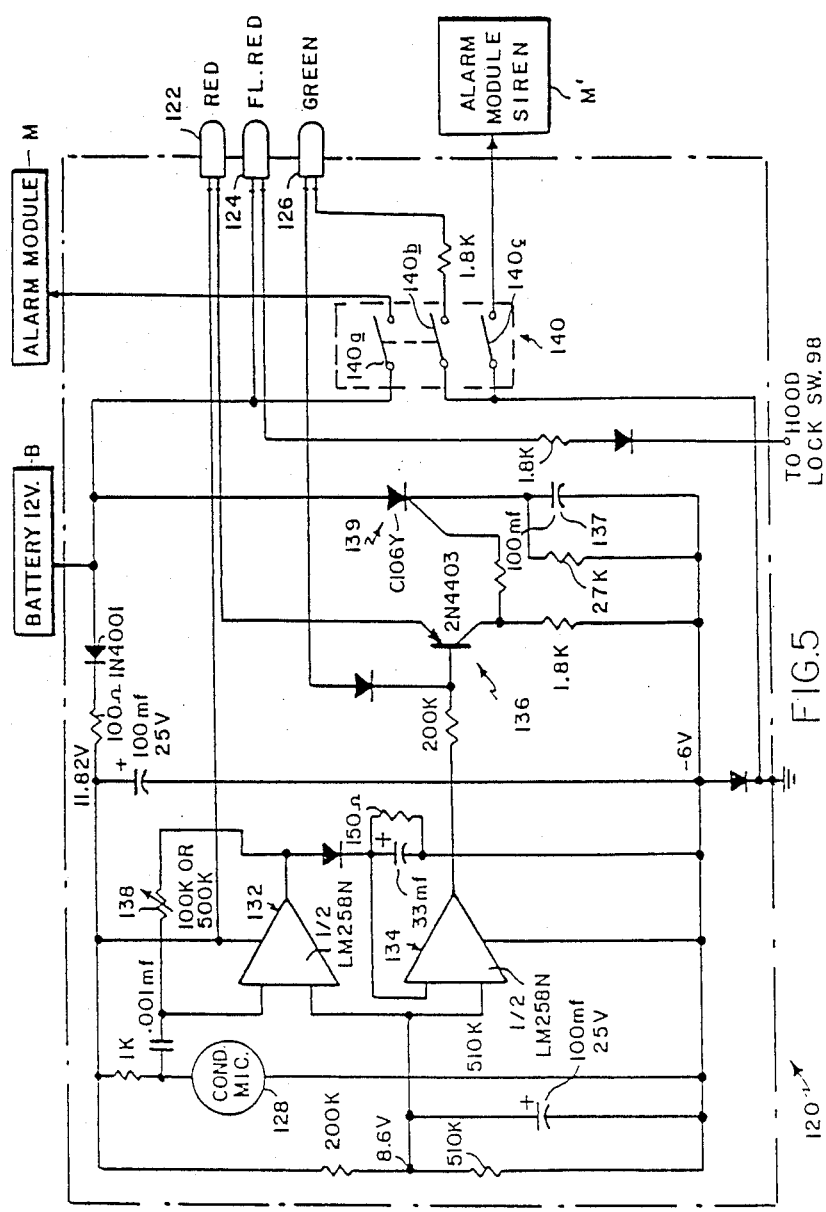
FIG. 5 is a schematic diagram illustrating the FIG. 2 apparatus incorporated into a sound detection and alarm mode selection system.

Refer now to FIG. 5 which illustrates a noise detection and alarm mode selection circuit 120 for use in conjunction with the apparatus 60 described above. Circuit 120 is contained on a single small printed circuit card which may be located at a convenient location adjacent to apparatus 60 described above. It may be used in conjunction with a known vehicle alarm module such as the one marketed by Boston Auto Security, Inc Hingham, Mass. under its designation M-2 Passive Alarm Module. That known alarm module turns on a siren when it detects a voltage drop in the line from the vehicle's battery. Such voltage drops occur when a light controlled by the opening of a car door or trunk lid goes on as well as when attempts are made to start the car, etc. Basically, circuit 120 produces a voltage drop in the battery line which is sensed by the alarm module when a thief causes noise incident to his attempting to break into the vehicle. In addition, circuit 120 permits that known alarm system to have different operating modes and indicates these modes to the vehicle operator.

Referring to FIG. 5, circuit 120 includes three indicating lamps 122(red), 124(flashing red) and 126(green). The circuit card is positioned adjacent to lock 60 so that the lamps 122, 124, and 126 are visible to the vehicle operator. Circuit 120 also incorporates a condenser microphone 128 which has a frequency response that embraces sound frequencies associated with breaking and entering, e.g. noises produced by breaking glass, scraping, banging, etc. The output of microphone 128 is applied to an amplifier 132 whose output is then coupled by way of a second amplifier 134 to the base of a transistor 136. A sensitivity-adjusting variable resistor 138 is included in the feedback circuit of amplifier 132 to permit adjustment of the sound level to which the circuit 120 will respond. When the signal from amplifier 132 exceeds a certain amplitude, the signal at the transistor 136 collector turns on an SCR 139 connected between ground and the vehicle's 12 volt battery B. The SCR remains conducting for a selected period of time, e.g. 2 seconds, dependent upon the charge time of a capacitor 137 connected between the SCR collector and ground and which builds up a voltage sufficient to cut off the SCR. The momentary conduction of the SCR 139 produces a voltage drop which is detected by the associated alarm module M which thereupon activates the module's siren M1 or other noisemaking device. The values of the various electrical components in circuit 120 are indicated in FIG. 5.

Circuit 120 also includes three switches 140a, 140b, and 140c controlled by a single switch slide 140 positioned so that it is accessible to the vehicle operator. Switches 140a and 140b operate together and are closed when the slide is pushed to a forward position. Switch 140c is closed when the slide is pushed to a rear position. All of the switches are open when the slide is in a middle position. Lamp 122 is connected between amplifier 132 and the emitter of transistor 136. Lamp 124 is connected between the battery B and contact 86 of the hood lock switch 98 or the M-2 Passive Alarm Module described above. Lamp 126 is connected to one terminal of switch 140a, the other terminal of which is connected to the battery. The other lead from lamp 126 is connected to one terminal of switch 140b, the other terminal of which is grounded. Switch 140c is connected between ground and the siren of the associated alarm module.

As stated previously, normally the switch slide 140 is in its middle position so that all of the switches are open. In that position, assuming the associated hood lock switch 98 in apparatus 60 is closed, circuit 120 operating in its normal alarm mode will respond to noises due to glass breakage and the like by causing a voltage drop in the line from the battery that is sensed by the associated alarm module which will thereupon sound the alarm. When slide 140 is in this middle position and the hood lock switch 98 is closed or the associated Passive Alarm Module is armed, lamp 124 will flash red indicating that the security system is activated.

In the event that the operator wishes to test the microphone 128 or to adjust the sensitivity of circuit 120 without sounding the alarm, he can make intrusion-type noises while the hood lock switch 98 is open. The circuit 120 will respond to such noises at a level determined by the setting of variable resistor 138 by turning on lamp 122. During such test with switch 98 being open, lamp 124 does not flash.

When the operator wishes to temporarily prevent the alarm system from passively setting even if the hood lock switch 98 is closed, he can move the slide 140 to its forward position to close switches 140a and 140b. Such deactivation may be desirable, for example, when the operator is having the vehicle parked by a valet service. When circuit 120 is in this condition or mode, the green lamp 126 is turned on indicating this fact and an alarm disable signal, i.e. the battery voltage, is applied to the associated alarm module via switch 140a so that that module will not passively arm.

Switch 140c is a panic switch whose closure enables the vehicle operator to immediately activate the alarm in the event of imminent trouble.

It can be seen from the foregoing, then, that circuit 120, particularly when used in conjunction with the anti-theft apparatus 60 described above, increases the versatility of vehicle anti-theft systems. It enables the operator to test the operability of the noise-responsive part of the system as well as to bypass the system in the event that is desirable for one reason or another, while displaying the deactivated status or mode of the system. Accordingly, the present system should prove to be quite desirable to those having a need to protect their vehicles and the contents thereof.

It will thus be seen that the objects set forth above, among those made apparent from the preceding description, are efficiently attained. Also, certain changes may be made in the above construction without departing from the scope of the invention. For example, circuit 120, instead of creating a voltage drop that is sensed by the associated alarm module in response to an intrusion noise, can be arranged to trigger the alarm module directly using the noise signal originating at microphone 128. Therefore, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed as new and desired to be secured by Letters Patent of the United States is:

1. Vehicle security apparatus, comprising:
   (A) a tubular housing having a housing bore;
   (B) a lock barrel having a retractable latch, and a rotary lock cylinder for controlling said latch, said barrel being slidably received in said housing bore and movable between an unlocked extended position, and a locked retracted position within said housing bore;
   (C) a spring positioned in said housing bore and which biases said barrel toward its extended position; and
   (D) detent means for establishing said extended and retracted positions of said barrel by engagement with said latch; said detent means including
   (i) a first detent section that engages said latch when said barrel is extended a first, appreciable distance within said housing bore to its extended position,
   (ii) a second detent section that engages said latch when said barrel is extended a second, lesser distance within said housing bore to its retracted position, and
   (iii) a third detent section disposed adjacent said latch when said barrel is extended a third distance within said housing bore, said third distance being different from said first and second distances, and
   (iv) wherein said third detent section and said latch are configured for enabling rotation of said barrel within said housing when said barrel is at said third distance so that said barrel assumes a release position in which said latch no longer engages said detent means, whereby said barrel can be pulled entirely out of said housing.

2. The vehicle security apparatus in accordance with claim 1, wherein one of said third detent section and said latch includes a ramp-like configuration for enabling rotation of said barrel within said housing to said release position.

3. The vehicle security apparatus in accordance with claim 2, wherein said third detent section includes said ramp-like configuration.

* * * * *